United States Patent [19]

Mangalam

[11] Patent Number: 5,299,455
[45] Date of Patent: Apr. 5, 1994

[54] METHOD AND INSTRUMENTATION SYSTEM FOR MEASURING AIRSPEED AND FLOW ANGLE

[76] Inventor: Siva M. Mangalam, 17 Mile Course, Kingsmill on the James, Williamsburg, Va. 23185

[21] Appl. No.: 860,780

[22] Filed: Mar. 27, 1992

[51] Int. Cl.$^5$ .......................... G01C 21/00; G01F 1/68
[52] U.S. Cl. ......................................... 73/180; 73/181; 73/204.11
[58] Field of Search ..................... 73/180, 181, 204.11, 73/147; 340/966, 968, 969

[56] References Cited

U.S. PATENT DOCUMENTS

| | | | |
|---|---|---|---|
| 2,923,152 | 2/1960 | Mabry et al. | 73/179 |
| 3,069,906 | 12/1962 | Eiland, Jr. | 73/180 |
| 3,082,622 | 3/1963 | Andrew | 73/180 |
| 3,443,431 | 5/1969 | Hagen | 73/178 |
| 3,475,958 | 11/1969 | Sabadishin et al. | 73/180 |
| 3,482,445 | 12/1969 | Leo et al. | 73/182 |
| 3,500,685 | 3/1970 | Gwathmey | 73/180 |
| 3,646,811 | 3/1972 | DeLeo et al. | 73/182 |
| 4,230,290 | 10/1980 | Townsend et al. | 244/1 R |
| 4,428,549 | 1/1984 | Halliday et al. | 244/1 R |
| 4,563,684 | 1/1986 | Maris | 73/147 |
| 4,672,846 | 6/1987 | LeBlond et al. | 73/180 |

Primary Examiner—Donald O. Woodiel
Attorney, Agent, or Firm—Raymond L. Greene

[57] ABSTRACT

An instrumentation system for measuring airspeed and angle-of-attack (AOA) is provided. The system includes a sensor assembly, a constant voltage anemometer, a microprocessor assembly with software, and an output device suitable for powering conventional cockpit display or for powering other speed AOA devices such as engine inlets and stability augmenters. The sensor assembly is a pair of orthogonal miniature cylinders with embedded micro-thin multielement hot film sensors. Operation of the sensor assembly by the constant voltage anemometer provides detection of cylinder leading edge flow stagnation point and oscillatory frequency. The stagnation point determination provides angle-of-attack data; the oscillatory flow frequency provides data to calculate cylinder shed-vortex frequency which is converted to airspeed data. The sensor assembly is solid-state, having no ports, diaphragms or moving parts and is heated in normal operation.

15 Claims, 11 Drawing Sheets

METHOD AND INSTRUMENTATION SYSTEM FOR MEASURING AIRSPEED AND FLOW ANGLE

BACKGROUND OF THE INVENTION

1. Field of the Invention

The invention is related to the instrumentation technology field and more particularly to airspeed indicators for aircraft or wind tunnel applications.

2. Description of Prior Art

There are several types of airspeed and fluid speed indicators well known in the art. The most common devices are pitot tube systems using total and static pressure measurements. Pitot devices are extensively used in both aircraft and wind tunnels and also in boats and water tunnels.

Pitot devices are fairly rugged and provide satisfactory results for steady flow conditions where there are no rapid changes in flow speed and where the flow direction is fixed. Inaccurate and unsatisfactory results occur, however, where the flow changes direction so as to enter the total pressure port at an angle. Additionally, the response time of the pitot system prevents measurement of rapidly changing airspeeds, such as those encountered during oscillatory or unstable flow.

Another type of flow speed measurement system avoids the directional problem of a fixed pitot tube allowing steady state flow measurement in a particular plane such as the horizontal plane. These devices are commonly known as vane and cup anemometers and use the kinetic energy of the fluid to rotate mechanical components such as vanes or cups. Although these devices can measure flow speed accurately from any direction with the plane of rotation, the inertial characteristics of the rotating components prevent accurate measurement of rapid changes in speed. Rotary anemometers are also unsuitable for high speed flows and occupy a relatively large space.

Combination conventional instrumentation such as those using total-static pressure probes for airspeed, conical or hemispherical probes for flow angles, and "flying cruciforms" for establishing local flow angles and Mach numbers has poor frequency response characteristics and is inherently unsuitable for three-dimensional and unsteady flows. This type of flow is typical of conditions encountered in close proximity to full scale aircraft inlets in both confined and free jet flows.

A further type of instrumentation for wind tunnel use is based on optical devices such as laser velocimeters. These devices can provide accurate response to rapid changes in both direction and magnitude of a flow field, but require complex and expensive optical alignment systems and are generally unsuited for in-flight systems.

Another type of sensor system uses multi-element hot-wire or hot film anemometry. These sensors can provide good frequency response but they are usually fragile, sensitive to temperature changes and require accurate and repeated in-situ calibration for satisfactory performance.

The limitations of state-of-the-art instrumentation prevents the real-time measurement of unsteady airflow velocity except in limited test conditions such as wind tunnel model testing. Accurate real-time measurements of flow speed and angle needed for in-flight control of jet engine inlets, compressor guide vanes and rotors and other surfaces requiring active control are not available. Similarly accurate measurements needed in reduced stability aircraft are likewise available. As a result, unnecessarily large safety margins must be built in to prevent inlet unstarts, compressor stalls or loss of control of the aircraft. These larger safety margins reduce the available performance of the specific component and ultimately degrade aircraft performance.

SUMMARY OF THE INVENTION

Accordingly, it is an object of the present invention to provide an instrumentation system and method for determining airspeed and flow angle having a high-frequency response suitable for rapid variations in flow speed.

It is a further object of the present invention to provide an instrumentation system and method for determining airspeed and flow angle having a high-frequency response to rapid variations in flow direction.

It is yet another object of the present invention to provide an instrumentation system having rugged design characteristics suitable for on-aircraft use.

It is still a further object of the invention to provide an instrumentation system having a three-dimensional flow sensing capability.

It is still another object of the invention to provide an instrumentation system having highly accurate real-time response capability of measuring oscillatory and unstable flow fields on both wings and lifting surfaces in turbomachinery and engine inlets.

The invention achieves these and other objects by providing an orthogonal pair of miniature cylinders with embedded micro-thin multi-element sensors used in conjunction with constant voltage anemometers. Determination of flow speed is accomplished by measurement of the characteristic vortex shedding frequencies associated with the cylinder pair. The flow direction is determined by detection of a phase reversal in the flow shear stresses at the stagnation points on the miniature cylinders and by determination of other flow characteristics including a first harmonic "dither" frequency and a reduction in shear stress amplitude. The invention operates by powering the micro-thin, multi-element, hot film sensors mounted or deposited on the orthogonal miniature cylinders. Power is supplied by a constant voltage anemometer which provides an output to airspeed and angle-of-attack indicators. In the embodiment using the invention as a control device, the output is sent directly to the controlling electronic, jet engine inlet control or other required device.

BRIEF DESCRIPTION OF THE DRAWINGS

The above and numerous other objects of the invention that may be achieved by the method and preferred embodiment of the invention will be more readily understood from the following detailed description and the appended drawings wherein.

DETAILED DESCRIPTION OF THE INVENTION

Figure 1:
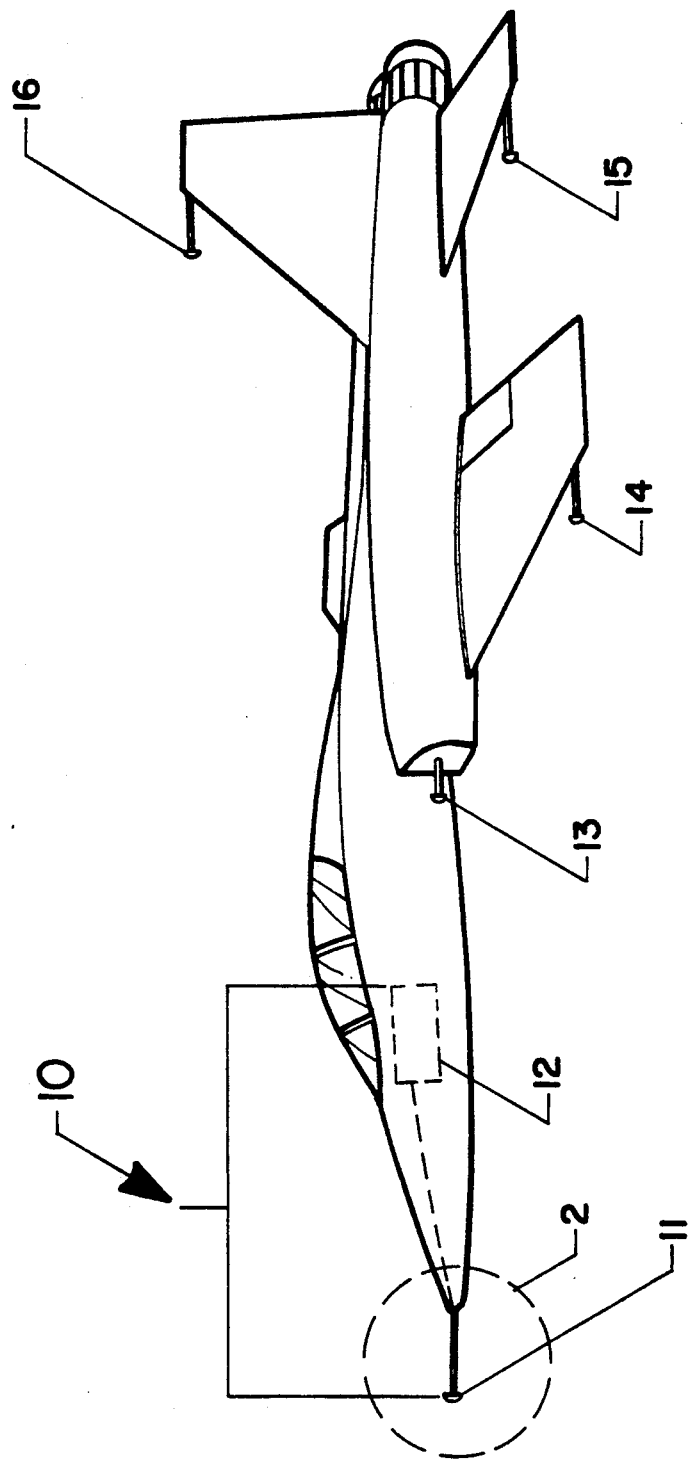
FIG. 1 is a side view of an aircraft showing the location of sensors and processing units.

Referring now to FIG. 1, the instrumentation system of the invention, designated generally by the reference numeral 10, is shown with a representative location of sensor 11. Signal processor unit 12 contains the microprocessor, anemometer circuitry and other electronics to drive the sensor 11 and to supply signal cockpit displays or servo controllers for operation of flight stability systems, engine inlet controllers and the like. Sensor 13 is located to provide signals for controlling inlet guide vanes, stator angles or other inlet geometry functions.

Figure 2:
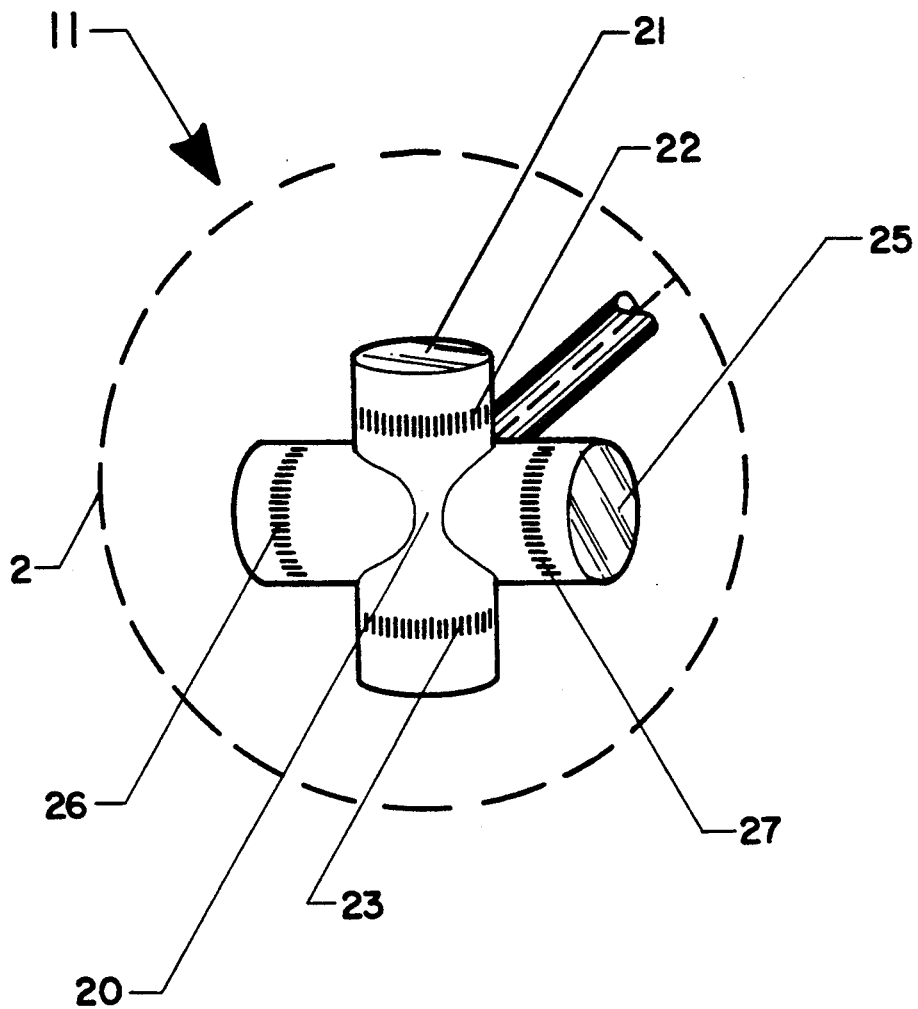
FIG. 2 is a perspective view of the miniature intersecting cylinder configuration for the sensors.

Other sensors, such as wing tip sensor 14, stabilator sensor 15, and vertical fin sensor 16 provide signals suitable for operating additional aircraft systems. These aircraft systems include stability augmentation on reduced static stability aircraft, active lift control for reducing gust effects on low wingloaded aircraft, and other active control functions. Sensor 11 in section 2 is shown in detail in FIG. 2.

Sensor 11 in one embodiment is an orthogonal pair of intersecting mini-cylinders 20. Vertical cylinder 21 has an upper array 22 of hot film elements and a lower array 23. Horizontal cylinder 25 has a right hand array 26 of hot film elements and a left hand array 27. The mini-cylinders are attached to an existing pitot boom of an aircraft replacing the speed sensing function of the pitot system and additionally providing both angle-of-attack and sideslip information.

Figure 3:
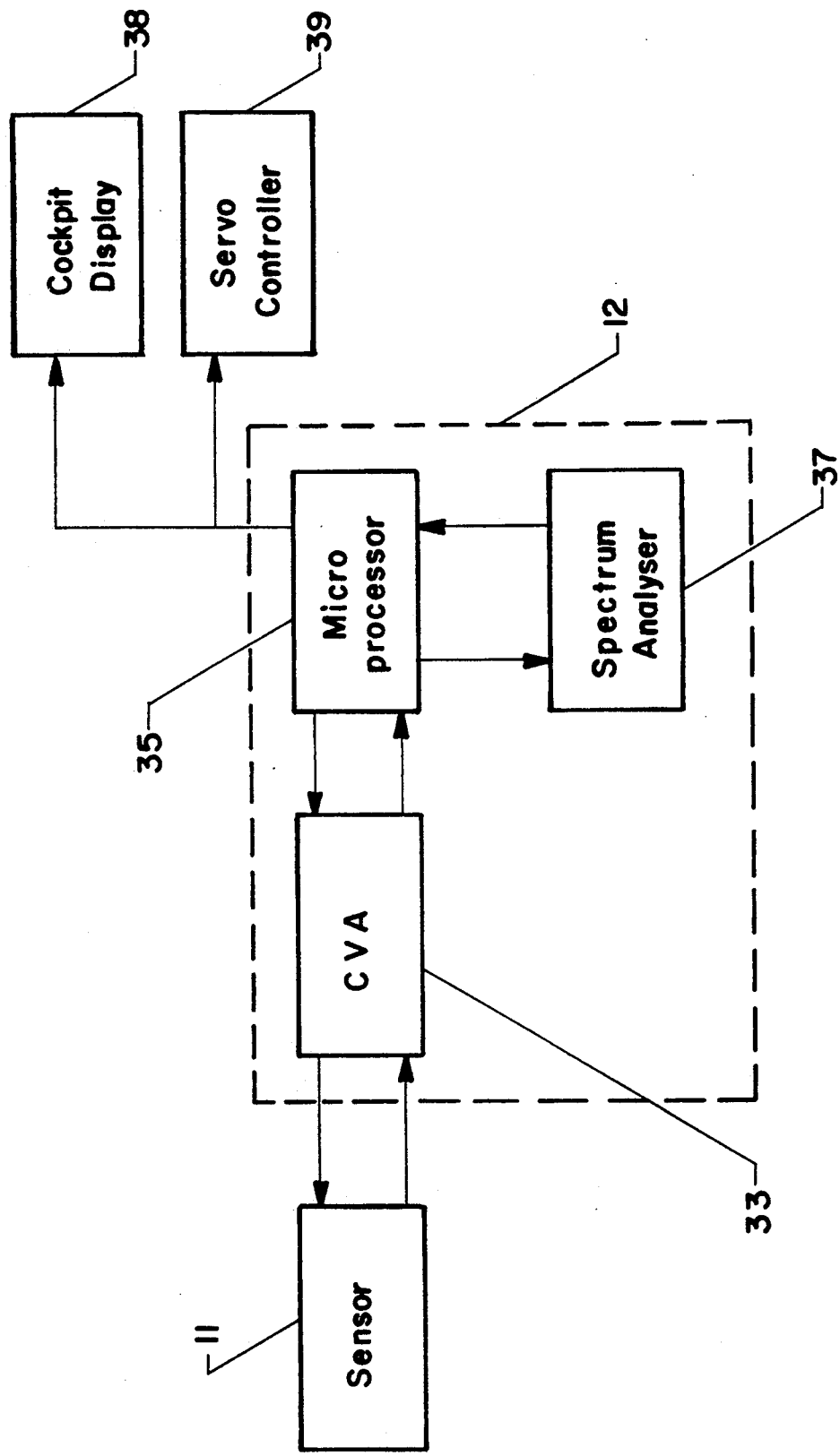
FIG. 3 is a block diagram of the functional components of the instrumentation system.

Power and control of the sensor arrays on the mini-cylinders is provided by the signal analyzer and control assembly 12 as shown in FIG. 3. This assembly contains a constant voltage anemometer (CVA) 33, a microprocessor 35, and a spectrum analyzer 37. Sensor 11 is operated at a constant voltage and variable current. By measuring voltage drop across the sensor elements, phase and frequency of the airstream can be determined. Analysis of phase and frequency generates data which can be displayed as airspeed and angle-of-attack in cockpit display 38 or which can be used as control input for stability augmenters or other equipment through servo-controller 39.

Figure 4:
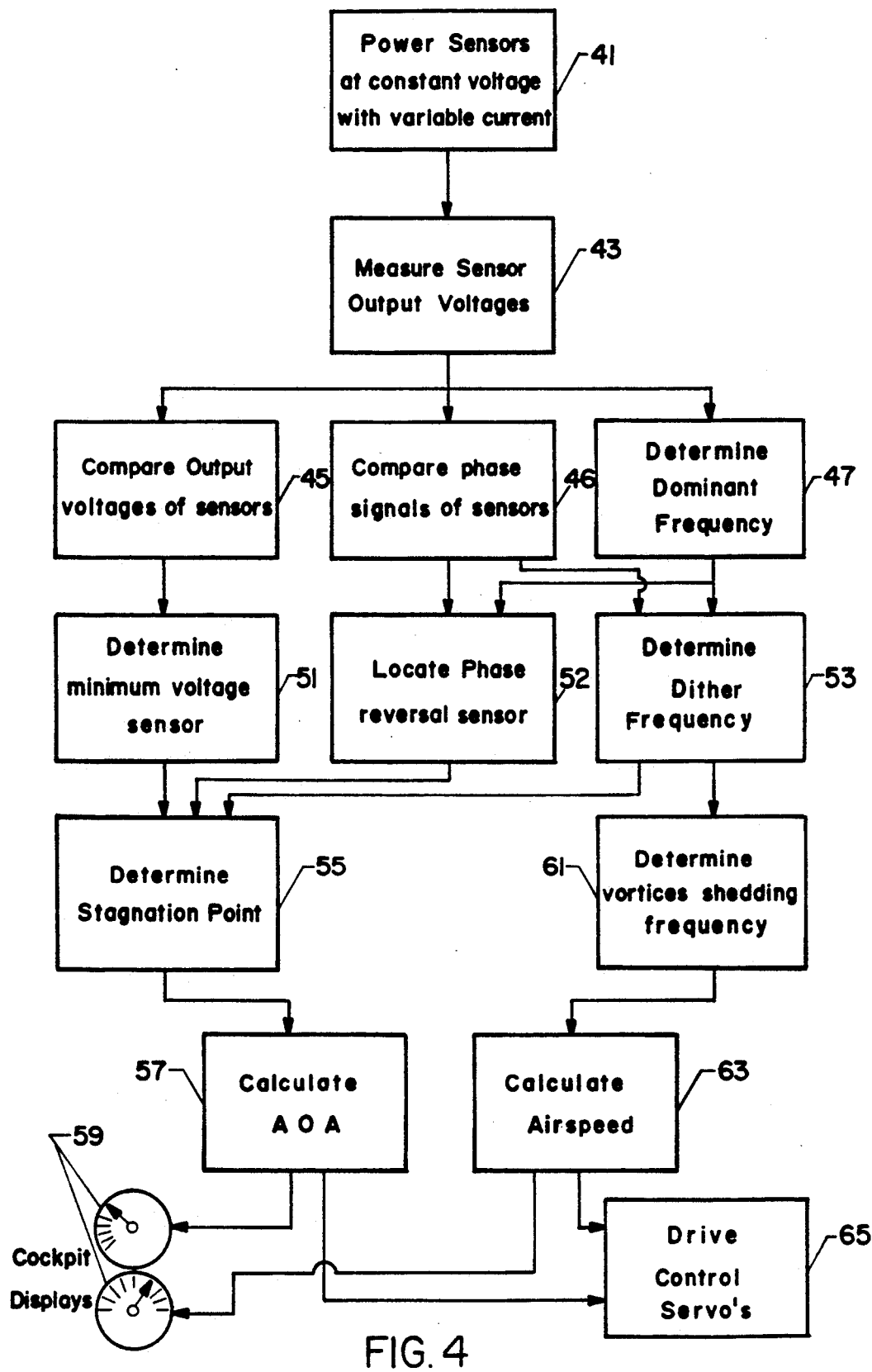
FIG. 4 is a flow diagram of the major steps in the software program.

FIG. 4 depicts the functional steps in generating airspeed and angle-of-attack using the instrumentation system. Power 41 is applied to the hot film at a variable current flow. Output voltage 43 of the hot film elements is measured and a simultaneous comparison of sensor voltages 45 and sensor phase 46 is made along with a determination of the dominant frequency 47 of the flow. A microprocessor then determines which sensor has the minimum voltage 51 and which sensors have opposite phase to find phase reversal 52. At the same time, the dither frequency 53, that is the first harmonic of the dominant frequency is located. From this information, the microprocessor determines stagnation point 55 and thereby determines angle-of-attack 57. Data from the dominant flow frequency 47 provides vortices shedding frequency 61 which allows a computation of airspeed 63. Angle-of-attack 57 and airspeed 63 are then used to drive cockpit displays 59 and to provide signals to drive control servos 65. These servos can power hydraulic or other actuators (not shown) to provide for active flight controls, stability augmentation, engine inlet control and other conventional functions.

Figure 5:
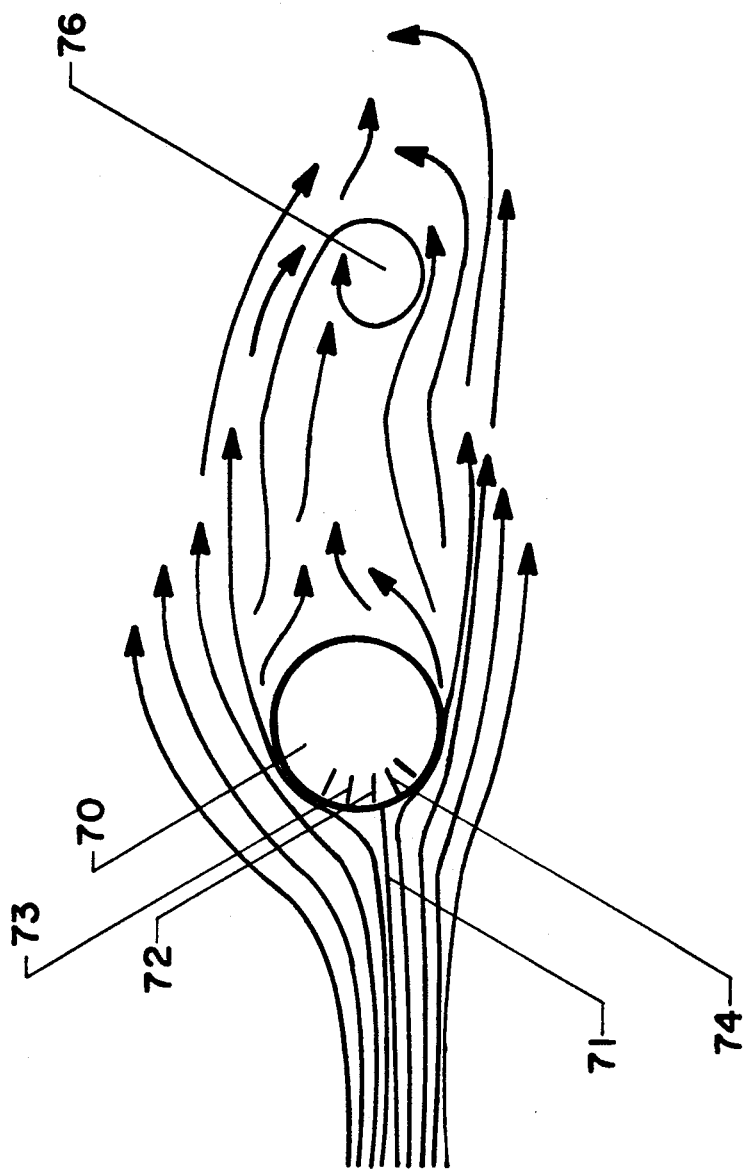
FIG. 5 depicts airflow around a miniature cylinder.

FIG. 5 depicts the airflow around a cylinder 70 such as used on the sensor of this instrumentation system. Streamline 71 is the stagnation streamline which meets the cylinder at sensor element 72. In actual operation, even in steady state smooth flow conditions, streamline 71 has an oscillatory motion, moving back and forth slightly in the cylinder so that the stagnation point moves from sensor 72 to sensor 73 to sensor 72 to sensor 74 and so on. Although this motion is very small, the frequency is set up by the alternate shedding of trailing vortices.

Figure 6:
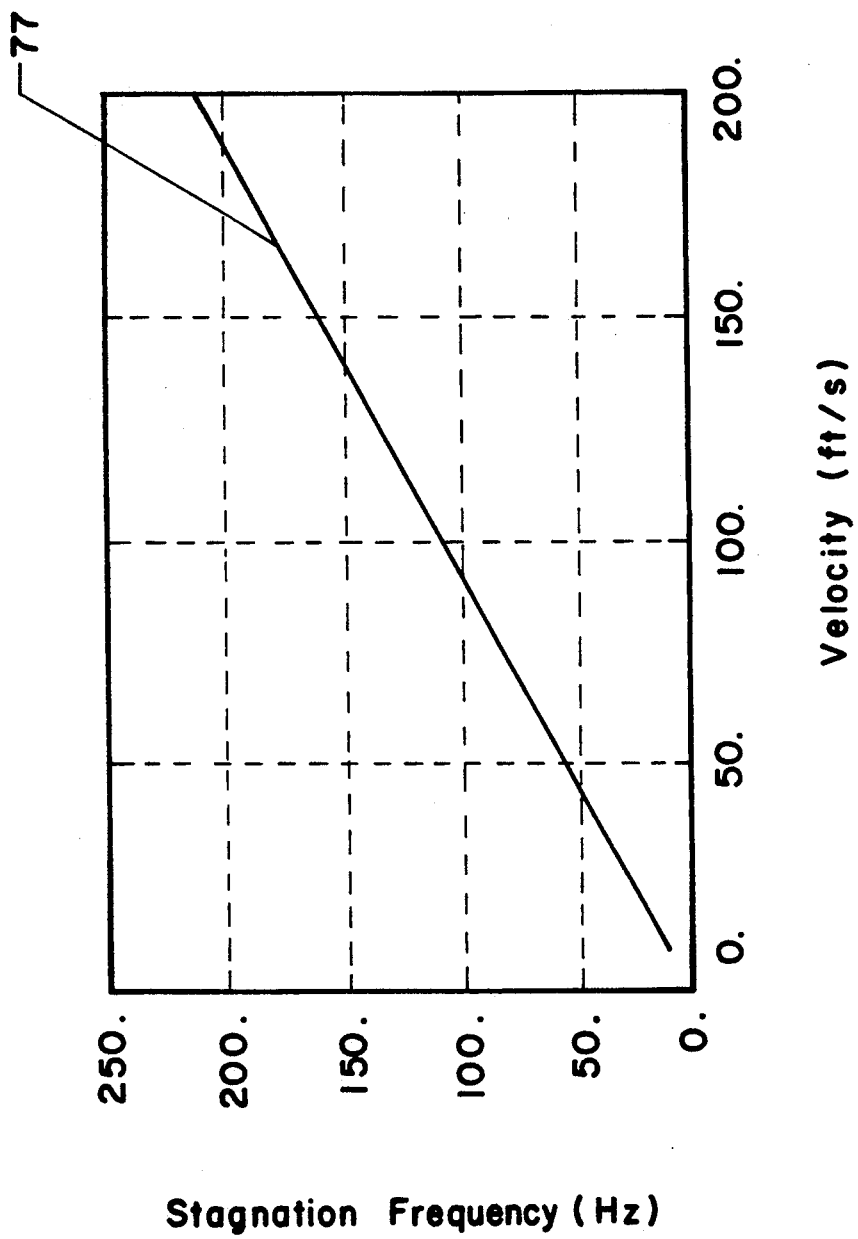
FIG. 6 is a plot showing the relationship of stagnation frequency to velocity.

FIG. 6 shows the relationship of the stagnation frequency to velocity as a linear relationship. With a specific cylinder configuration, the velocity may be easily determined by $V = Kf$ where K is the Strouhal Number over cylinder diameter and f is the stagnation frequency.

Figure 7:
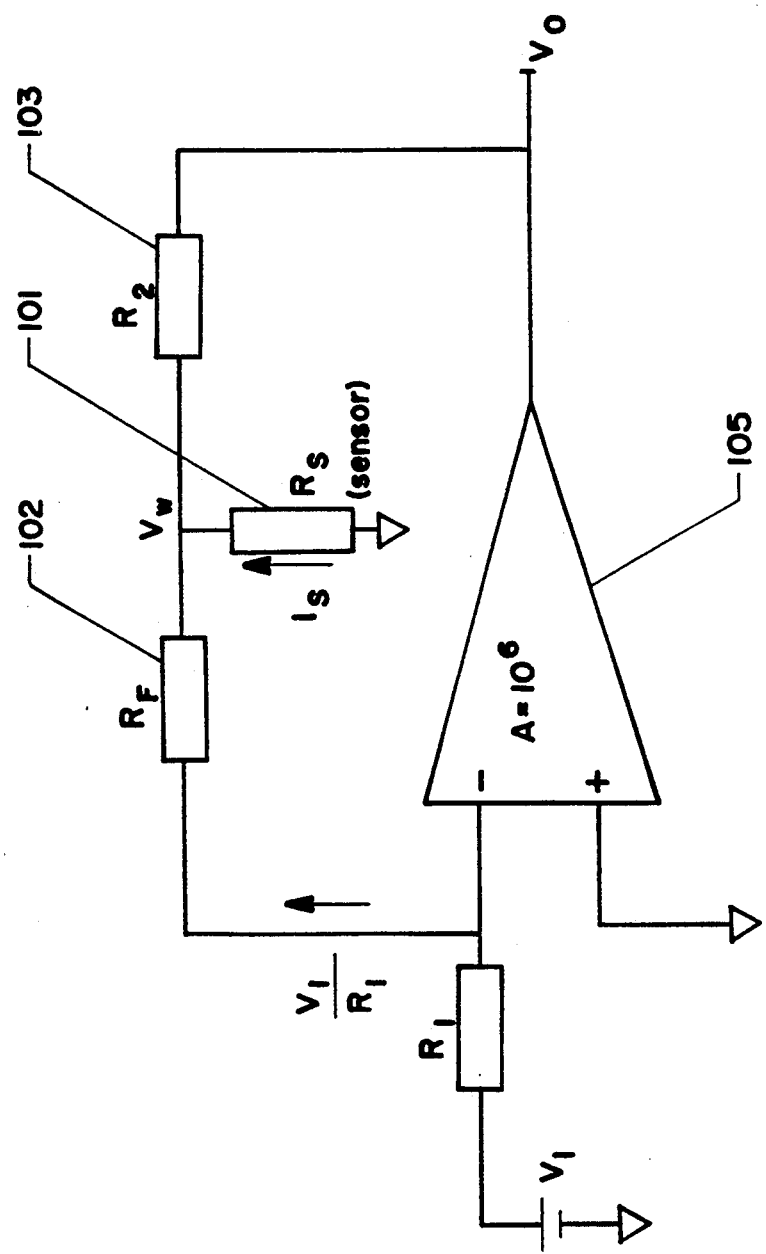
FIG. 7 is a schematic view of the constant voltage anemometer.

FIG. 7 shows the circuit of the constant voltage anemometer having a hot film sensor 101 located between resistor 102 and resistor 103. High gain amplifier 105 drives the circuit as more fully described in U.S. Pat. No. 5,074,147 which is incorporated herein in its entirety by reference.

Figure 8:
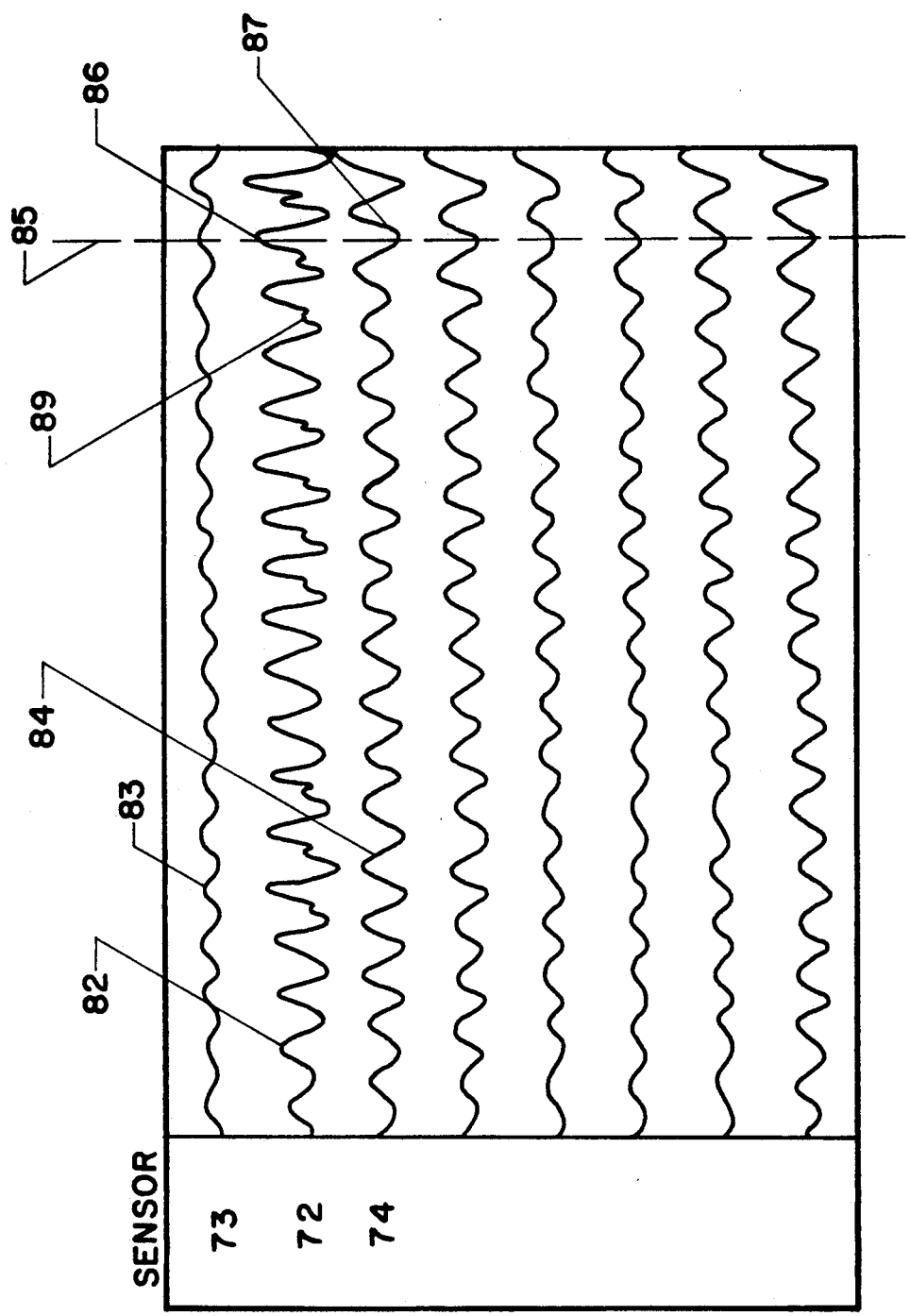
FIG. 8 is a plot of signals from hot film sensors on a cylinder.

FIG. 8 charts the frequency and phase relationships of hot film elements located in the sensor assembly of this instrumentation system. For illustrative purposes, sensor 72 provides data plot 82 and sensor 73 and 74 provide plots 83 and 84 respectively. At any instant of time, represented here by line 85, the frequency between sensors can be compared. Note that there is a reversal of phase of the dominant frequency identified by data point 86 when compared to data point 87. Phase reversal occurs across a stagnation point indicating that a stagnation point lies near sensor 72. Also indicating the presence of a stagnation point is the appearance of the first harmonic 89 of the dominant frequency. These small pulses increase in size as the stagnation point is approached and continue to increase while the frequency peak 86 representing the dominant frequency continues to be reduced in amplitude. At the exact location of the stagnation point, the amplitude of first harmonic 89 and the pulse at data point 86 have the same magnitude. As a result, the flow frequency is double the dominant frequency, referred to herein as the dither frequency.

Figure 9B:
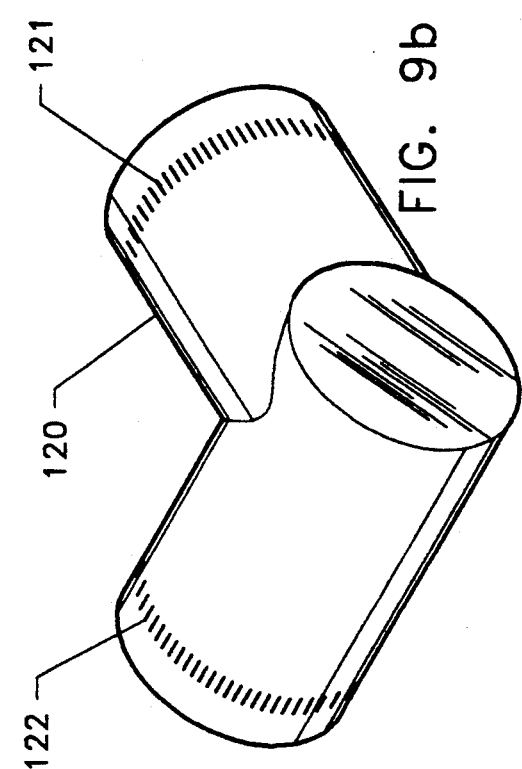
FIGS. 9a, b, c, and d, show various configurations of the sensor assembly.
Figure 9D:
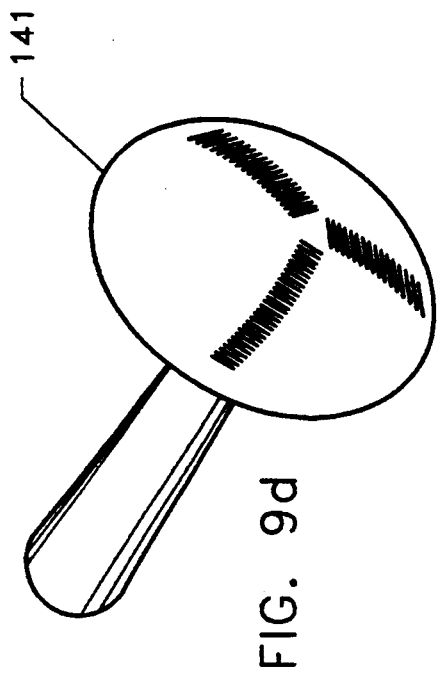
Figure 9A:
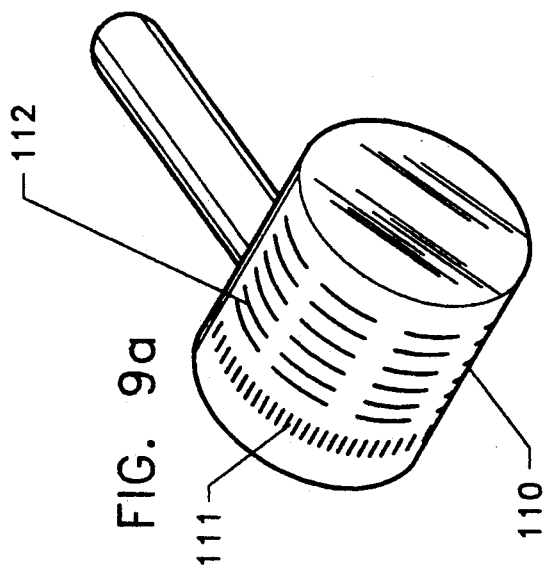
Figure 9C:
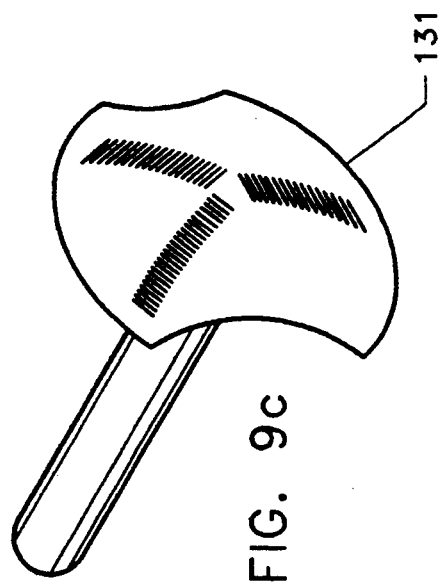

FIGS. 9a, b, c and d depict alternative embodiments of the sensor assembly of the present invention. FIG. 9a shows a horizontally-aligned mini-cylinder 110 having hot film elements 111 positioned to form an orthogonal pair with hot film elements 112. Similarly sensor 120 in FIG. 9b has elements 121 and 122 forming an orthogonal pair. The requirement for sensor configuration is that a shape be provided which allows calculation of the vortex shedding frequency and thereby the velocity of the flow. FIGS. 9c and 9d show ellipsoidal 131 and spherical 141 shapes using three sensor arrays from which a calculation of perpendicular component velocities can be made.

Figure 10:
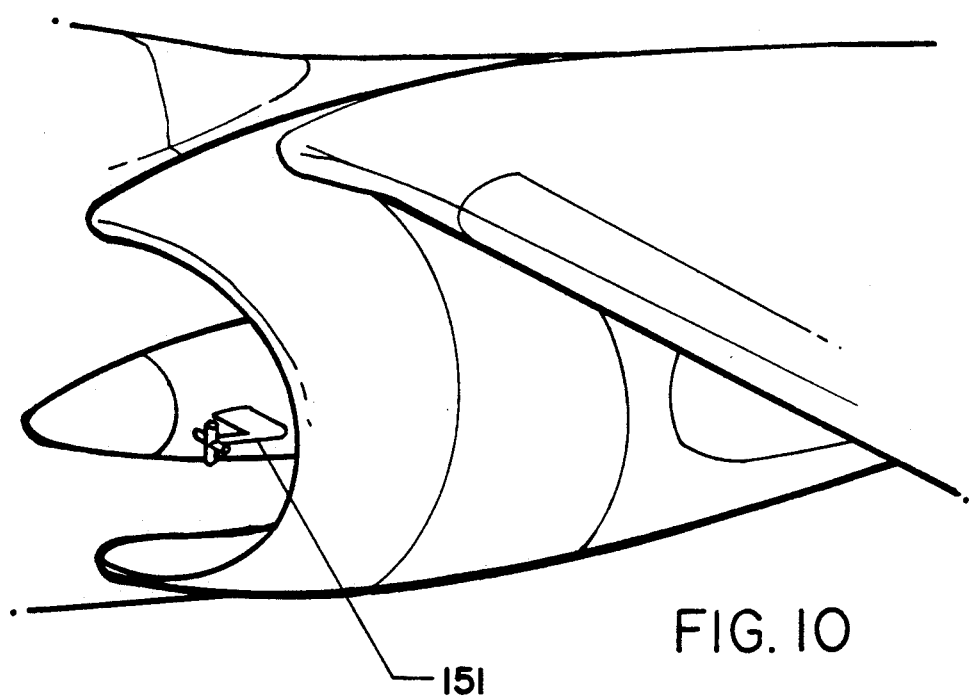
FIG. 10 is a partial view of an engine controller.
Figure 11:
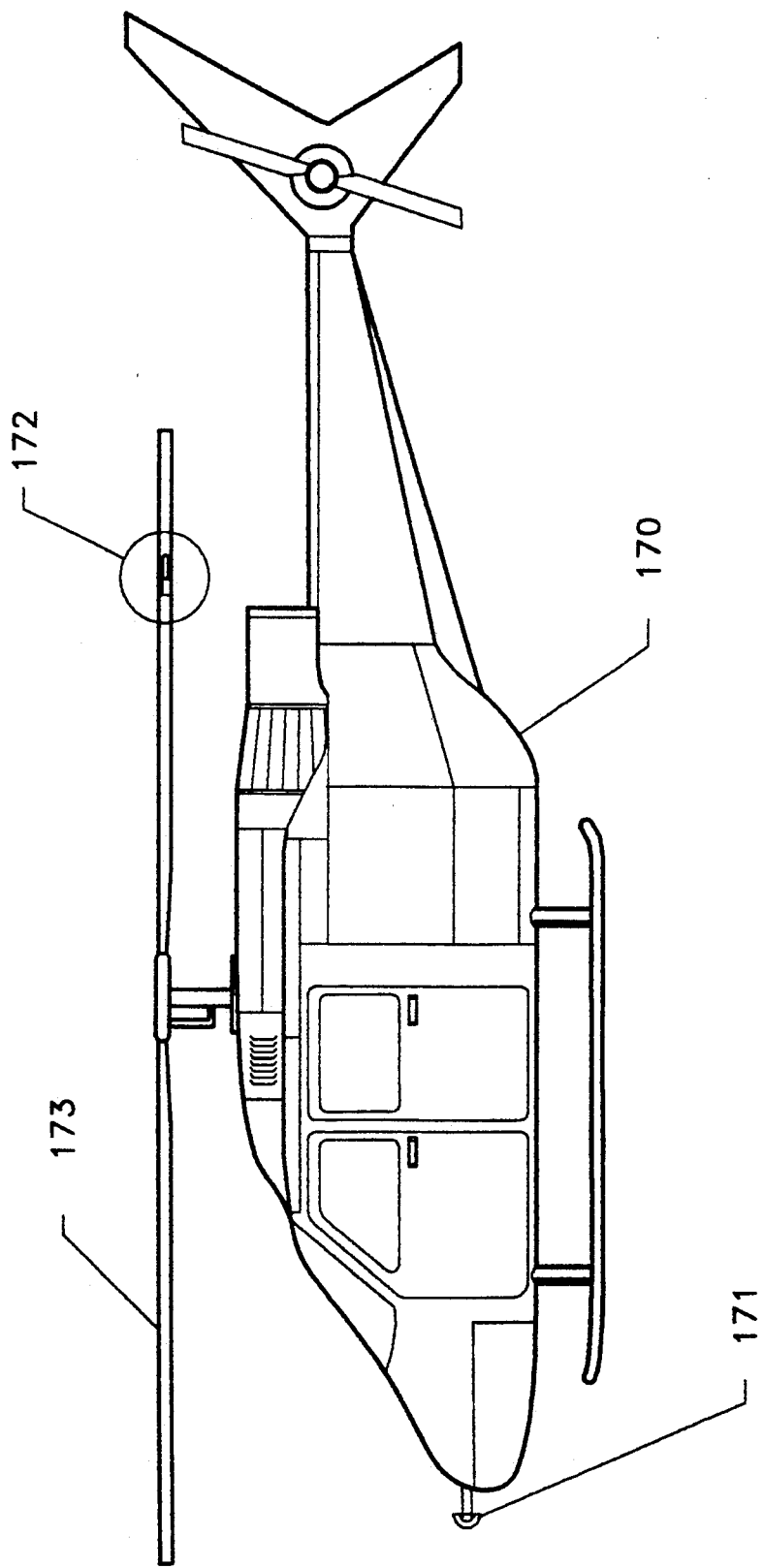
FIG. 11 is a view of a rotor craft blade showing the sensor installation.

Depending on the particular application, one configuration may be preferred over another. For example, referring to FIG. 10, sensor 151 for an engine inlet controller is depicted. The accurate sensing of both flow angles and speed permit better control of various engine inlet guides including vanes and variable stators. FIG. 11 depicts the system installed on a helicopter 170. As the system is accurate at very low speeds and at any angle-of-attack, a helicopter probe 171 is possible where a pitot tube would be very limited. Likewise, the miniature form of the cylinder may be adapted to special use such as controlling the advancing blade, sensor 172, and controlling retreating blade, sensor 173.

The benefits and advantages of the present invention are numerous. The invention provides a solid state combined airspeed and angle-of-attack indicating system which has no moving parts, is inherently immune to icing, and has no ports or other apparatus to reduce reliability. Response time is effectively instantaneous avoiding instrument lags common in current angle-of-attack systems. In addition to angel-of-attack, yaw angles are also provided with a single sensor assembly. It is therefore to be understood that, within the scope of the appended claims, the invention may be practiced other than as specifically described.

What is claimed as new and desired to be secured by Letters Patent of the United States is:

1. An aircraft instrument system for measuring airspeed and angle-of-attack comprising;
   a solid state sensor assembly formed with a pair of intersecting orthogonal miniature cylinders having a plurality of embedded micro-thin hot film elements on each cylinder;
   a constant voltage anemometer for detecting cylinder stagnation points and low frequency boundary layer flow oscillations connected to said solid state sensor assembly;
   a spectrum analyzer connected to and receiving signal inputs from said constant voltage anemometer;
   a microprocessor assembly connected to and providing control inputs to said constant voltage anemometer and receiving flow frequency and phase signals from said spectrum analyzer;
   a software program operating said microprocessor assembly to provide instrument system control and to calculate velocity and angle-of-attack based on frequency and phase data from said spectrum analyzer;
   an airspeed indicator driven by said microprocessor assembly; and
   an angle-of-attack indicator driven by said microprocessor assembly.

2. An aircraft instrument system for measuring airspeed and angle-of-attack comprising:
   a shaped surface having a plurality of embedded micro-thin hot elements sensors;
   means, attached to the hot element sensors, for sensing boundary layer flow field shear stress phase and stagnation points;
   means for converting output of said means for sensing phase and stagnation data to velocity and angle-of-attack data; and
   means for using velocity and angle-of-attack data received from said means for converting.

3. An aircraft instrument system as in claim 2 wherein said shaped surface is a pair of orthogonal intersecting miniature cylinders.

4. An aircraft instrument system as in claim 2 wherein said shaped surface is an ellipsoid having the embedded hot elements configured as two orthogonal arrays intersecting to form a cross.

5. An aircraft instrument system as in claim 2 wherein said plurality of micro-thin hot element sensors comprise hot film elements.

6. An aircraft instrument system as in claim 2 wherein said plurality of micro-thin hot element sensors comprise hot-wire elements.

7. An aircraft instrument system as in claim 2 wherein said means for sensing further comprises a constant voltage anemometer.

8. A aircraft instrument system as in claim 7 wherein said constant voltage anemometer has gain and response characteristics suitable for detection of boundary layer shear stress frequency and phase.

9. An aircraft instrument system as in claim 2 wherein said means for converting comprises a spectrum analyzer for identifying boundary layer shear stress frequency and phase.

10. An aircraft instrument system as in claim 9 wherein said means for converting further comprises a microprocessor assembly.

11. An aircraft instrument system as in claim 10 wherein said microprocessor assembly includes a software program providing control functions to said sensing means and providing for computation of velocity and angle-of-attack based on spectrum analyzer output.

12. An aircraft instrument system as in claim 2 wherein said means for using velocity and angle-of-attack is an aircraft instrument displaying airspeed and angle-of-attack.

13. An aircraft instrument system as in claim 2 wherein said means for using velocity and angle-of-attack comprises a servo suitable for operation of a flight control stability augmenter.

14. An aircraft instrument system as in claim 2 wherein said means for using velocity and angle-of-attack comprises a jet engine inlet controller.

15. A method for determining airspeed and angle-of-attack comprising the steps of:
   providing a hot-element sensor array located on a cylinder;
   detecting boundary layer flow over said hot element including shear stress phase and frequency;
   boundary layer detecting flow stagnation point through the process of locating a data point having a dither frequency;
   reduced amplitude signal and phase reversal;
   calculating angle-of-attack based on location of the flow stagnation point;
   detecting the dominant boundary layer oscillatory frequency at the leading edge of said cylinder;
   calculating the frequency of trailing edge shed vortices based on the leading edge oscillatory frequency; and
   calculating airspeed based on shed vortices frequency.

* * * * *